US012805436B2

(12) United States Patent
Herrmann et al.

(10) Patent No.: US 12,805,436 B2
(45) Date of Patent: Nov. 24, 2026

(54) METHODS AND IMAGING SYSTEMS FOR HARVESTING

(71) Applicant: Precision Planting LLC, Tremont, IL (US)

(72) Inventors: Aaron Herrmann, Edwards, IL (US); Todd Swanson, Morton, IL (US); Jason J. Stoller, Eureka, IL (US)

(73) Assignee: Precision Planting LLC, Tremont, IL (US)

( * ) Notice: Subject to any disclaimer, the term of this patent is extended or adjusted under 35 U.S.C. 154(b) by 71 days.

(21) Appl. No.: 18/929,311

(22) Filed: Oct. 28, 2024

(65) Prior Publication Data

US 2025/0048963 A1 Feb. 13, 2025

Related U.S. Application Data

(63) Continuation of application No. 18/183,992, filed on Mar. 15, 2023, now Pat. No. 12,150,406, which is a continuation of application No. 17/757,074, filed as application No. PCT/IB2020/060962 on Nov. 20, 2020, now Pat. No. 11,632,905.

(60) Provisional application No. 62/945,289, filed on Dec. 9, 2019.

(51) Int. Cl.

*A01D 41/12* (2006.01)
*A01D 41/127* (2006.01)
*A01D 41/14* (2006.01)
*A01D 45/02* (2006.01)

(52) U.S. Cl.

CPC ......... *A01D 41/127* (2013.01); *A01D 41/141* (2013.01); *A01D 45/021* (2013.01)

(58) Field of Classification Search

CPC ... A01D 41/127; A01D 41/141; A01D 45/021
See application file for complete search history.

(56) References Cited

U.S. PATENT DOCUMENTS

| | | | | |
|---|---|---|---|---|
| 9,983,142 | B2 * | 5/2018 | Acheson | G01N 33/0098 |
| 10,255,670 | B1 * | 4/2019 | Wu | H04N 7/183 |
| 10,515,425 | B2 * | 12/2019 | Koch | A01D 41/1273 |
| 10,537,062 | B2 * | 1/2020 | Brubaker | A01B 79/005 |
| 11,320,279 | B2 * | 5/2022 | Tomita | G05D 1/6484 |
| 11,457,563 | B2 * | 10/2022 | Dugas | A01B 69/007 |
| 11,470,776 | B2 * | 10/2022 | Barther | A01D 41/1271 |
| 11,510,364 | B2 * | 11/2022 | Vandike | A01D 41/127 |
| 11,937,527 | B2 * | 3/2024 | Ferrari | G06T 7/11 |
| 12,105,190 | B2 * | 10/2024 | Mahieu | A01D 41/1271 |
| 2011/0270495 | A1 * | 11/2011 | Knapp | A01D 41/127 701/50 |
| 2012/0253760 | A1 * | 10/2012 | Zielke | A01D 41/1275 703/2 |

(Continued)

*Primary Examiner* — Tyler J Lee

(57) ABSTRACT

Described herein are methods and harvesters for adjusting settings of a harvester. In one embodiment, a computer implemented method includes capturing, with at least one image capture device that is located on the harvester, images of a field view of an unharvested region to be harvested, analyzing the captured images to determine crop information for a crop of a harvested region that is adjacent to the unharvested region, and adjusting settings or operating parameters of the harvester for the unharvested region based on the crop information for the crop of the harvested region.

14 Claims, 11 Drawing Sheets

(56) References Cited

U.S. PATENT DOCUMENTS

| | | | | |
|---|---|---|---|---|
| 2015/0293068 | A1* | 10/2015 | Acheson | A01D 41/127 702/170 |
| 2017/0013777 | A1* | 1/2017 | Posselius | A01D 41/141 |
| 2017/0032473 | A1* | 2/2017 | Koch | A01D 41/1273 |
| 2017/0142900 | A1* | 5/2017 | Mahieu | A01D 41/1243 |
| 2018/0053067 | A1* | 2/2018 | Walker | A01D 41/1273 |
| 2018/0310474 | A1* | 11/2018 | Posselius | A01D 41/1243 |
| 2018/0335335 | A1* | 11/2018 | Bhavsar | G01G 23/01 |
| 2018/0338422 | A1* | 11/2018 | Brubaker | A01D 41/1208 |
| 2019/0021226 | A1* | 1/2019 | Dima | A01D 34/008 |
| 2020/0064144 | A1* | 2/2020 | Tomita | B62D 6/00 |
| 2020/0068804 | A1* | 3/2020 | Barther | G06T 7/74 |
| 2020/0133262 | A1* | 4/2020 | Suleman | G05D 1/0278 |
| 2020/0323134 | A1* | 10/2020 | Darr | A01D 41/127 |
| 2020/0404842 | A1* | 12/2020 | Dugas | A01D 43/07 |
| 2021/0015039 | A1* | 1/2021 | Vandike | G06V 20/56 |
| 2021/0034867 | A1* | 2/2021 | Ferrari | G05D 1/0236 |
| 2021/0084820 | A1* | 3/2021 | Vandike | A01B 79/005 |
| 2021/0127573 | A1* | 5/2021 | Mahieu | A01D 41/1243 |
| 2021/0378176 | A1* | 12/2021 | Leenknegt | G05D 1/0088 |

* cited by examiner

METHODS AND IMAGING SYSTEMS FOR HARVESTING

CROSS-REFERENCE TO RELATED APPLICATIONS

This application is a continuation of U.S. application Ser. No. 18/183,992, filed 15 Mar. 2023, which is a continuation of U.S. application Ser. No. 17/757,074, filed 8 Jun. 2022, which is a national stage entry of PCT Application No. PCT/IB2020/060962, filed 20 Nov. 2020, which claims priority to U.S. Application No. 62/945,289, filed 9 Dec. 2019, which are incorporated herein by reference in their entireties.

TECHNICAL FIELD

Embodiments of the present disclosure relate to methods and imaging systems for harvesting operations with a harvester.

BACKGROUND

Planters are used for planting seeds of crops (e.g., corn, soybeans) in a field. Some planters include a display monitor within a cab for displaying a coverage map that shows regions of the field that have been planted. The coverage map of the planter is generated based on planting data collected by the planter.

A combine harvester or combine is a machine that harvests crops. A coverage map of a combine displays regions of the field that have been harvested by that combine. A coverage map allows the operator of the combine to know that a region of the field has already been harvested by the same combine. Yield data for a field can then be generated after harvesting the field. The yield data can be analyzed in order to potentially improve agricultural operations for a subsequent growing season.

BRIEF DESCRIPTION OF THE DRAWINGS

The present disclosure is illustrated by way of example, and not by way of limitation, in the figures of the accompanying drawings and in which.

DETAILED DESCRIPTION

Described herein are methods and imaging systems for harvesting. In one example, a harvester includes at least one image capturing device (e.g., camera) for capturing images of a field view of first region to be harvested that is adjacent to a second region that has been harvested. The captured images are analyzed to determine residue crop from the second region that was discarded by the harvester while harvesting the second region. Parameters of the harvester for the first region can be adjusted based on analyzing the captured images.

In the following description, numerous details are set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Figure 1:
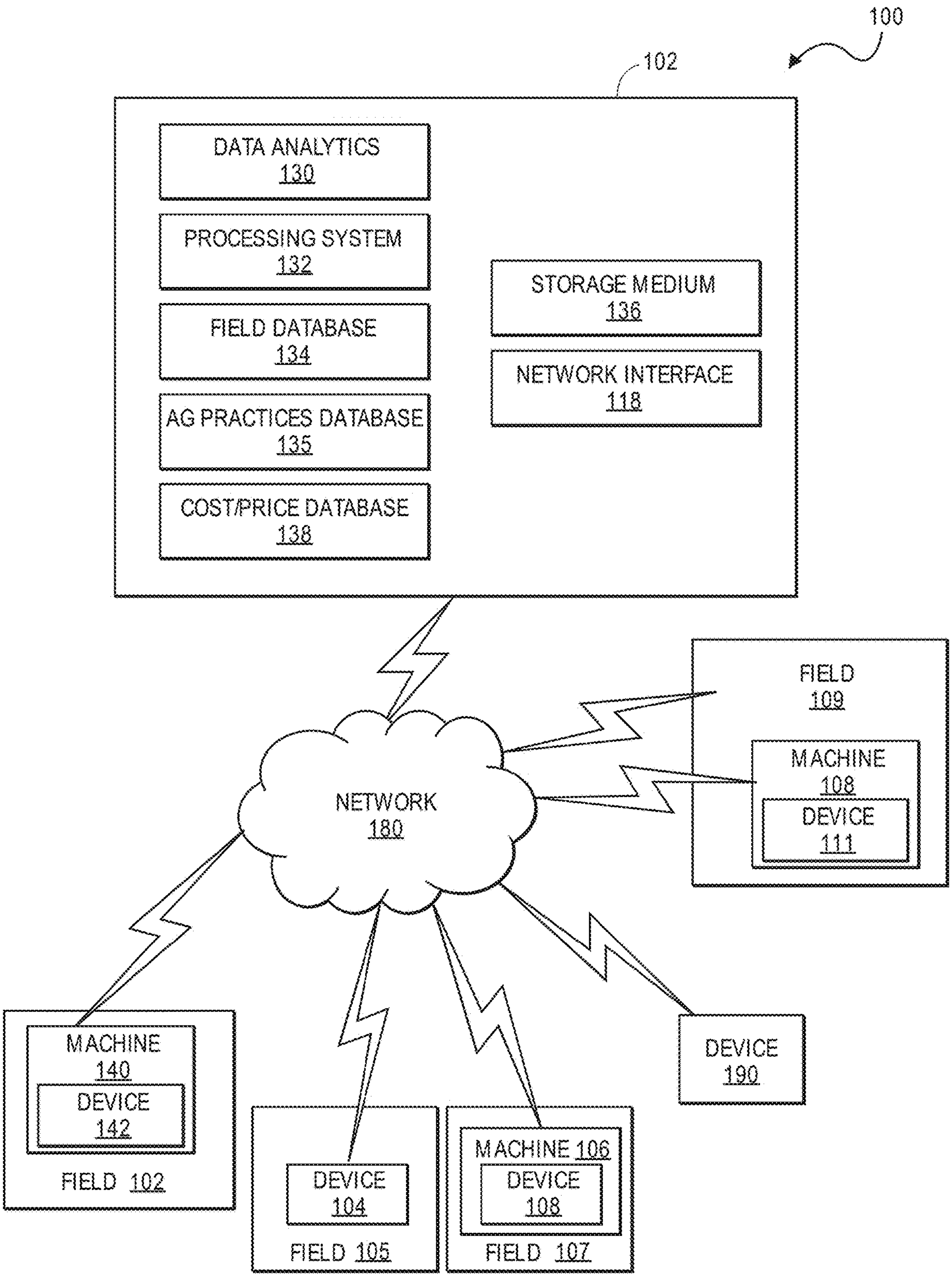
FIG. 1 shows an example of a system for collecting data of agricultural fields and performing analysis of the data of agricultural fields in accordance with one embodiment.

FIG. 1 shows an example of a system for collecting and analyzing agricultural data from agricultural fields in order to display customized agricultural data in accordance with one embodiment. For example, in one embodiment, the system 100 may be implemented as a cloud based system with servers, data processing devices, computers, etc. Aspects, features, and functionality of the system 100 can be implemented in servers, harvesters (e.g., combine harvester), planters, planter monitors, drones, laptops, tablets, computer terminals, client devices, user devices, handheld computers, personal digital assistants, cellular telephones, cameras, smart phones, mobile phones, computing devices, or a combination of any of these or other data processing devices.

In other embodiments, the system includes a network computer or an embedded processing device within another device (e.g., display device) or within a machine (e.g., planter, combine), or other types of data processing systems having fewer components or perhaps more components than that shown in FIG. 1. While illustrated with a monitor as the display device, the display device can by any display device, such as a monitor, a smartphone, a tablet, a personal computer, or any touch activated screen.

The system 100 (e.g., cloud based system) for collecting and analyzing agricultural data includes machines 140, 106, and 108 (e.g., harvesters, planters) for performing field operations (e.g., tillage, planting, fertilization, harvesting, etc). The machines can include devices (e.g., devices 142, 108, 111) in addition to other devices 104 and 190 (e.g., user devices, mobile device, tablet devices, drones, etc) for displaying customized agricultural data based on agricultural operations. The machines may also include sensors (e.g., image capturing devices, speed sensors, moisture sensors, auger sensors, mass flow sensors, head pressure sensors, seed sensors for detecting passage of seed, downforce sensors, actuator valves, OEM sensors, etc.) for capturing data of crops and soil conditions within associated fields (e.g., fields 102, 105, 107, 109). The system 100 includes an agricultural analysis system 102 and a storage medium 136 to store instructions, software, software programs, etc. for execution by the processing system 102 and for performing operations of the agricultural analysis system 102. A data analytics module 130 may perform analytics on agricultural data (e.g., images, field, yield, etc.) to generate crop predictions 162 relating to agricultural operations. For example, the crop predictions may predict yield (e.g., crop yield) based on development of crops (e.g., yield potential or ear potential for corn) at different growth stages.

A field information database 134 stores agricultural data (e.g., crop growth stage, soil types, soil characteristics, moisture holding capacity, etc.) for the fields that are being monitored by the system 100. An agricultural practices information database 135 stores farm practices information (e.g., harvesting information, as-applied planting information, fertilization information, planting population, applied nutrients (e.g., nitrogen), yield levels, proprietary indices (e.g., ratio of seed population to a soil parameter), etc.) for the fields that are being monitored by the system 100. A cost/price database 138 stores input cost information (e.g., cost of seed, cost of nutrients (e.g., nitrogen)) and commodity price information (e.g., revenue from crop).

The system 100 shown in FIG. 1 may include a network interface 118 for communicating with other systems or devices such as drone devices, user devices, and machines (e.g., planters, combines) via a network 180 (e.g., Internet, wide area network, WiMax, satellite, cellular, IP network, etc.). The network interface includes one or more types of transceivers for communicating via the network 180.

The processing system 132 may include one or more microprocessors, processors, a system on a chip (integrated circuit), or one or more microcontrollers. The processing system includes processing logic for executing software instructions of one or more programs. The system 100 includes the storage medium 136 for storing data and programs for execution by the processing system. The storage medium 136 can store, for example, software components such as a software application for capturing images and performing analysis of the capturing images or any other software application. The storage medium 136 can be any known form of a machine readable non-transitory storage medium, such as semiconductor memory (e.g., flash; SRAM; DRAM; etc.) or non-volatile memory, such as hard disks or solid-state drive.

While the storage medium (e.g., machine-accessible non-transitory medium) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

Figure 2:
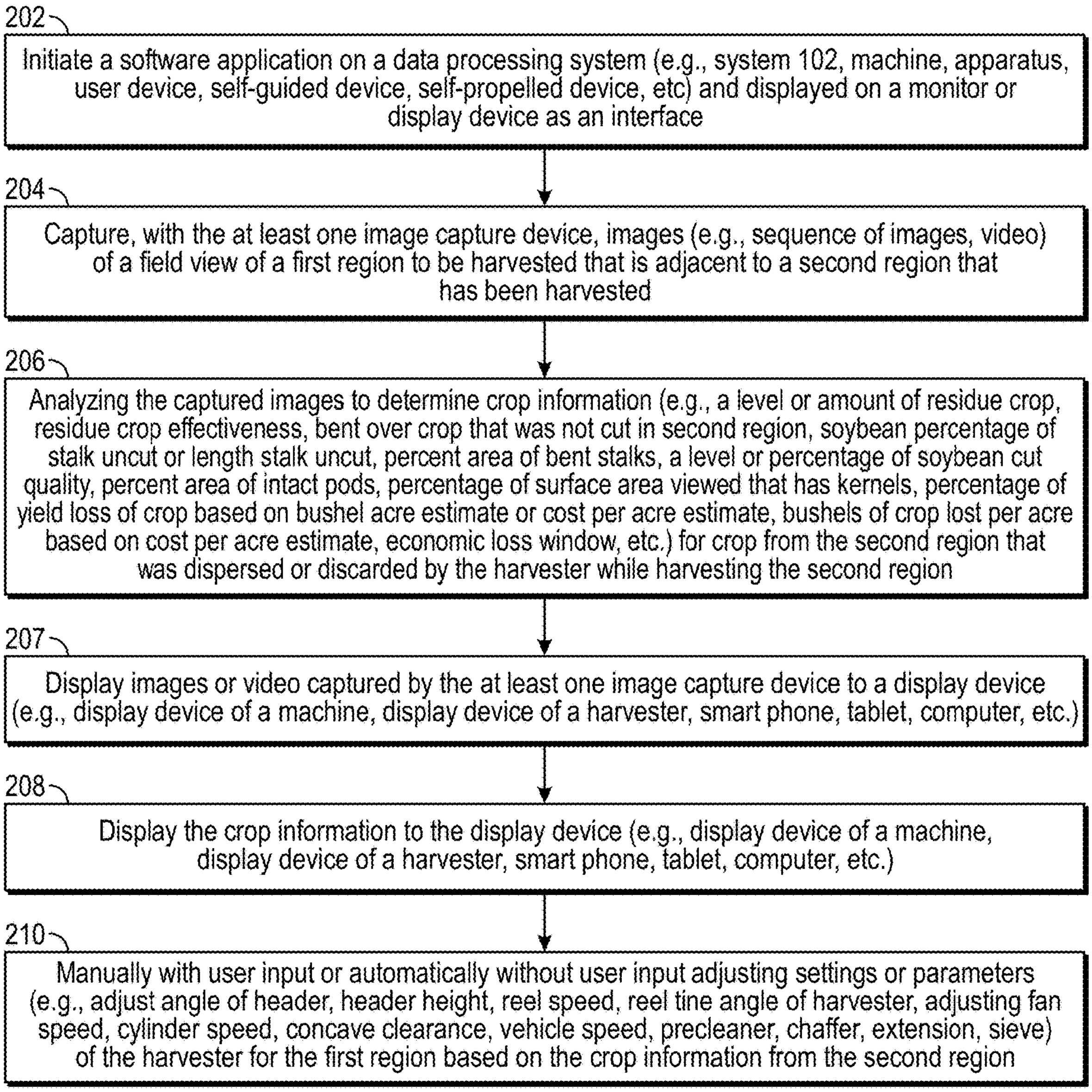
FIG. 2 illustrates a flow diagram of one embodiment for a method 200 of adjusting settings of a harvester based on capturing images of field regions.

FIG. 2 illustrates a flow diagram of one embodiment for a method 200 of adjusting settings of a harvester based on capturing images of field regions. The method 200 is performed by processing logic that may comprise hardware (circuitry, dedicated logic, etc.), software (such as is run on a general purpose computer system or a dedicated machine or a device), or a combination of both. In one embodiment, the method 200 is performed by processing logic of at least one data processing system (e.g., system 102, machine, apparatus, monitor, display device, user device, self-guided device, self-propelled device, etc). The data processing system executes instructions of a software application or program with processing logic. The software application or program can be initiated by the data processing system. In one example, a monitor or display device receives user input and provides a customized display for operations of the method 200.

At operation 202, a software application is initiated on a data processing system (e.g., system 102, machine, apparatus, user device, self-guided device, self-propelled device, etc) and displayed on a monitor or display device as an interface. The data processing system may be integrated with or coupled to a machine (e.g., harvester) that performs an application pass (e.g., harvesting). Alternatively, the data processing system may be integrated with an apparatus (e.g., drone, image capture device) associated with the machine that captures images during the application pass.

At least one image capturing device is mounted on a harvester to view the ground in front of the harvester, adjacent to the harvester, or just behind a header of the harvester. The at least one image capturing device can be positioned on the harvester to be in a row adjacent to a row that was previously harvested. At operation 204, the at least one image capture device captures images (e.g., sequence of images, video) of a field view of a first region to be harvested that is adjacent to a second region that has been harvested. The at least one image capturing device can be looking forward devices with respect to a direction of travel of the harvester that are positioned to view crops of the first region or downwards towards the ground.

At operation 206, the method includes analyzing the captured images to determine crop information (e.g., a level or amount of residue crop, residue crop effectiveness, crop header loss, bent over crop that was not cut in second region, soybean percentage of stalk uncut or length stalk uncut, percent area of bent stalks, a level or percentage of soybean cut quality, percent area of intact pods, percentage of surface area viewed that has kernels, percentage of yield loss of crop based on bushel acre estimate or cost per acre estimate, bushels of crop lost per acre based on cost per acre estimate, economic loss window, etc.) for crop from the second region that was dispersed or discarded by the harvester while harvesting the second region. An Economic Loss Window preferably displays the economic loss value in dollars lost per acre ($Loss/acre) attributable to the various yield robbing events. The calculated economic loss value may be continually displayed or the value may only be displayed only upon an alarm condition, such as when the value exceeds a predefined value, such as, for example, $3.00/acre. If an alarm condition is not present, the Economic Loss Window may simply display the word "Good" or some other desired designation. The Economic Loss Window may provide some sort of visual or audible alarm to alert the operator if the economic loss exceeds a predefined limit. Additionally, the Economic Loss Window may be associated or tied to other Windows (e.g., other Windows for harvesting settings such as angle of header, header height, reel speed, or reel tine angle of harvester) if an alarm condition is met in any of these other Windows, and such alarm condition is found to be the contributing factor to the alarm condition in the Economic Loss Window, then both Windows produce a visual or audible indication of the alarm condition. An ear loss, kernel loss, or header loss per row as determined by captured images can be used in determine the Economic Loss Window.

At operation 207, the method includes displaying images or video captured by the at least one image capture device to a display device (e.g., display device of a machine, display device of a harvester, smart phone, tablet, computer, etc.). At operation 208, the method includes displaying the crop information to the display device (e.g., display device of a machine, display device of a harvester, smart phone, tablet, computer, etc.). At operation 210, the method includes manually with user input or automatically without user input adjusting settings or parameters (e.g., adjust angle of header, header height, header speed, reel speed, reel tine angle, deck plate spacing, adjusting fan speed, cylinder speed, concave clearance, vehicle speed, precleaner, chaffer, extension, sieve, draper belt speed) of the harvester for the first region based on the crop information.

FIGS. 3-6 illustrate harvesters with imaging systems (e.g., image sensors, image capturing devices) positioned in different locations on each harvester in accordance with certain embodiments.

Figure 3:
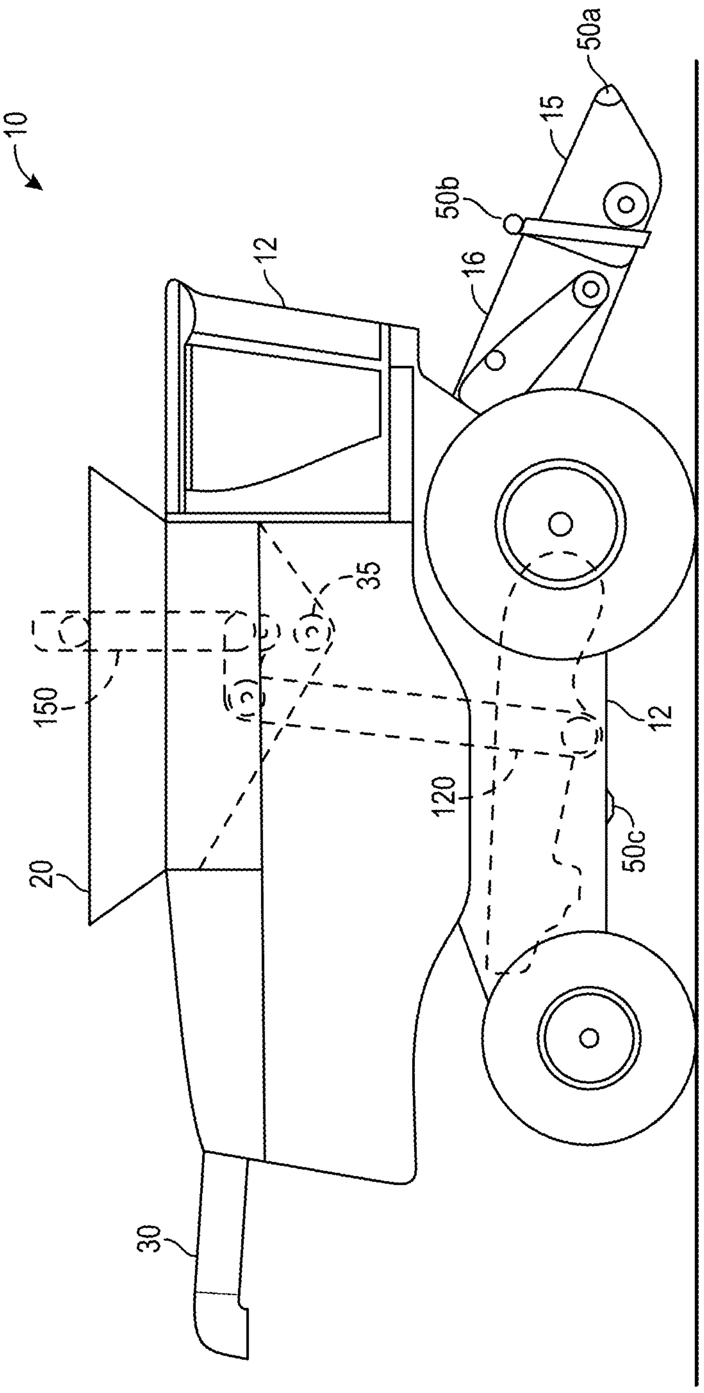
FIGS. 3-6 illustrate harvesters with an imaging system (e.g., image sensors, image capturing devices) positioned in different locations on each harvester in accordance with certain embodiments.

FIG. 3 illustrates a harvester or combine 10 having an imaging system 50 (e.g., image capturing devices 50*a*, 50*b*, 50*c*) in accordance with one embodiment. In one example, device 50*a* is integrated with a front of a snout, device 50*b* is positioned on an upper region of the header 15, and device 50*c* is positioned or mounted on a chassis 12 of the harvester 10. As the operator in cab 12 drives the combine 10 through the field, the imaging system 50 captures images of unharvested crop in a first region to be harvested that is adjacent to a second region that has been harvested. The captured images are analyzed to determine crop information from the second region that was dispersed by the harvester while harvesting the second region. Settings of the harvester for the first region can be adjusted based on analyzing the captured images as discussed in the operations of method 200.

The crop being harvested is drawn through the header 15 which gathers the plant material and feeds it into the feederhouse 16. The feederhouse 16 carries the plant material into the combine where the grain is separated from the other plant material. The separated grain is then carried upward by the grain elevator 120 to the auger 150 which carries the grain into the grain tank 20. The other plant material is discharged out the back of the combine.

When the grain tank 20 becomes full, a transport vehicle such as grain cart, wagon or truck is driven up next to the combine or the combine drives to the awaiting transport vehicle. The unloading auger 30 is swung outwardly until the end is positioned over the awaiting transport vehicle. A cross-auger 35 positioned in the bottom of the grain tank 20 feeds the grain to the extended unloading auger 30 which in turn deposits the grain into the awaiting transport vehicle below.

Live or real-time yield monitoring during crop harvesting is known in the art. One type of commercially available yield monitor uses a mass flow sensor as disclosed in U.S. Pat. No. 5,343,761, which is hereby incorporated herein in its entirety by reference. Using the speed and the width of the pass being harvested (usually the width of the header), it is possible to obtain a yield rate in bushels per acre by dividing the mass of grain harvested over a particular time period by the area harvested. In addition to reporting the current yield rate, such systems often incorporate GPS or other positioning systems in order to associate each reported yield rate with a discrete location in the field. Thus a yield map may be generated for reference in subsequent seasons.

Figure 4:
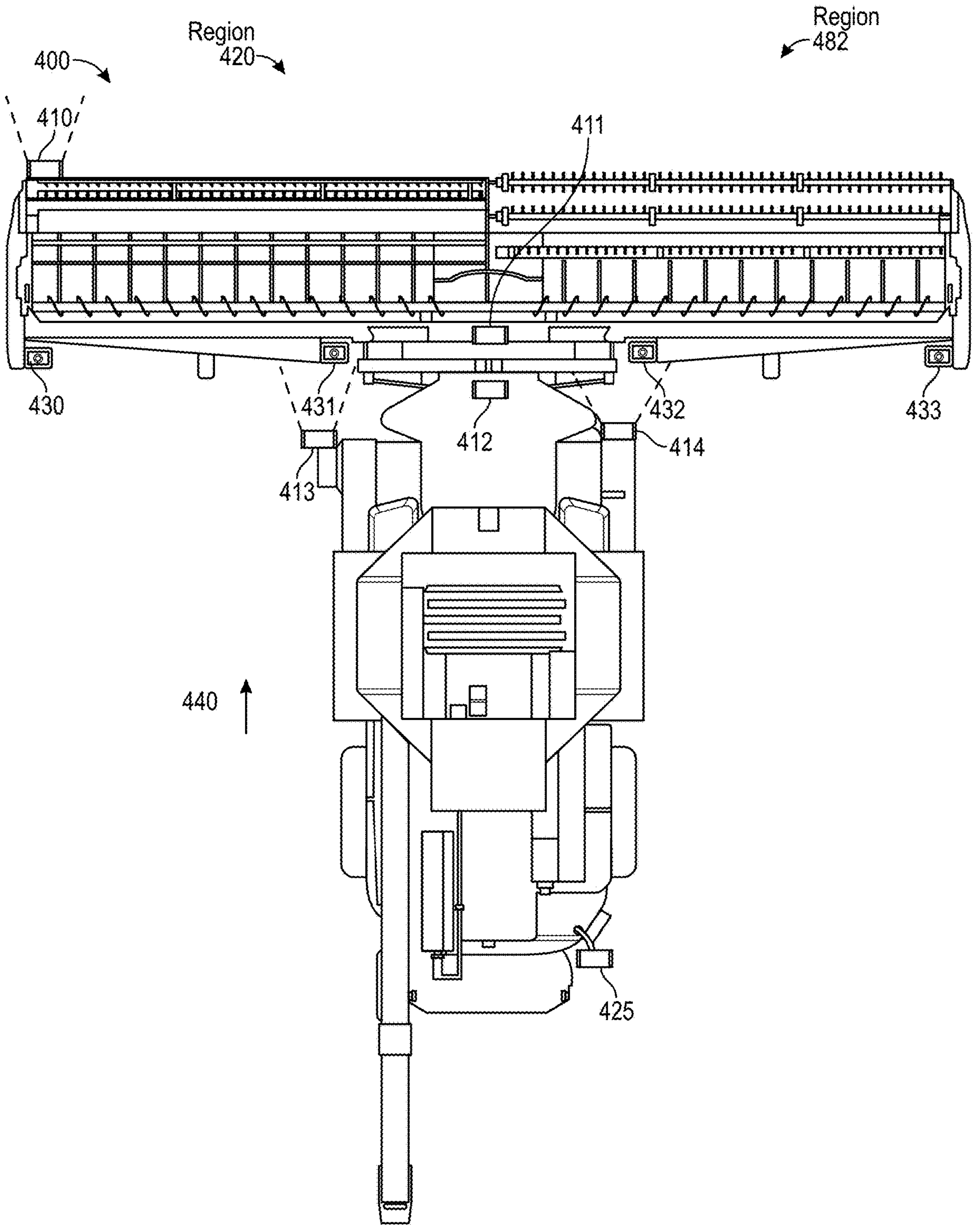

Referring to FIG. 4, the harvester 400 (e.g., bean harvester) includes looking forward sensors 410-414 (e.g., image capturing devices, cameras) having a field of view that is forward in a direction of travel 440 of the harvester, looking rearward sensor 425 having a field of view that is backward in an opposite direction of travel 440, and looking down sensors 430-433 that view the ground surface of a field. The looking down sensors will see where beans are bent over or see intact pods not harvested. To correct, a harvester can adjust an angle of a header that is harvesting the crop. Also, angle of header, header height, header speed, reel speed, reel tine angle, deck plate spacing, adjusting fan speed, cylinder speed, concave clearance, vehicle speed, precleaner, chaffer, extension, sieve, or draper belt speed can be changed based on captured images.

Figure 5:
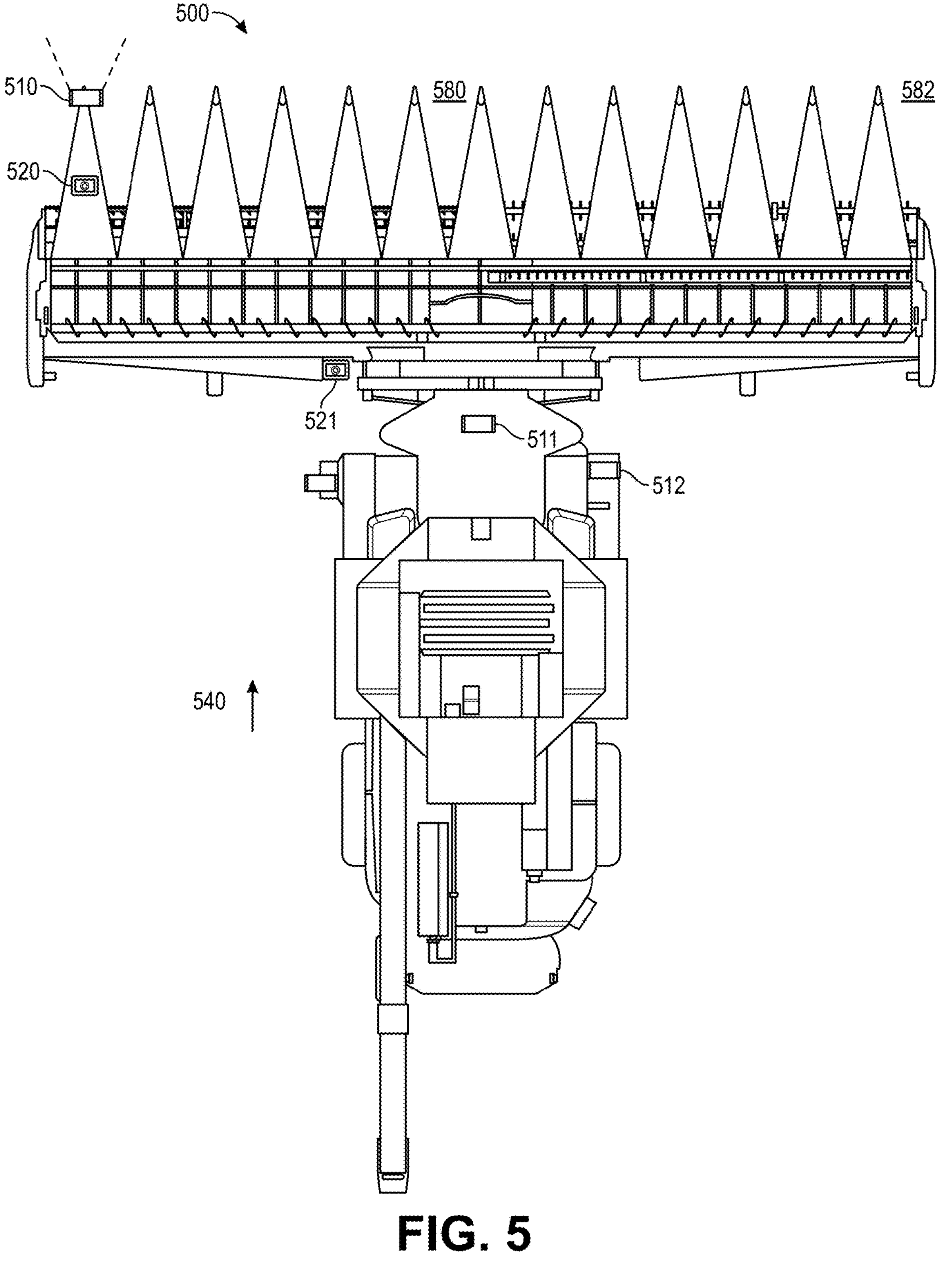

Referring to FIG. 5, the harvester 500 (e.g., corn harvester) includes looking forward sensors 510-512 having a field of view that is forward in a direction of travel 540 of the harvester and looking down sensors 520-521 that view the ground surface of a field.

Figure 6:
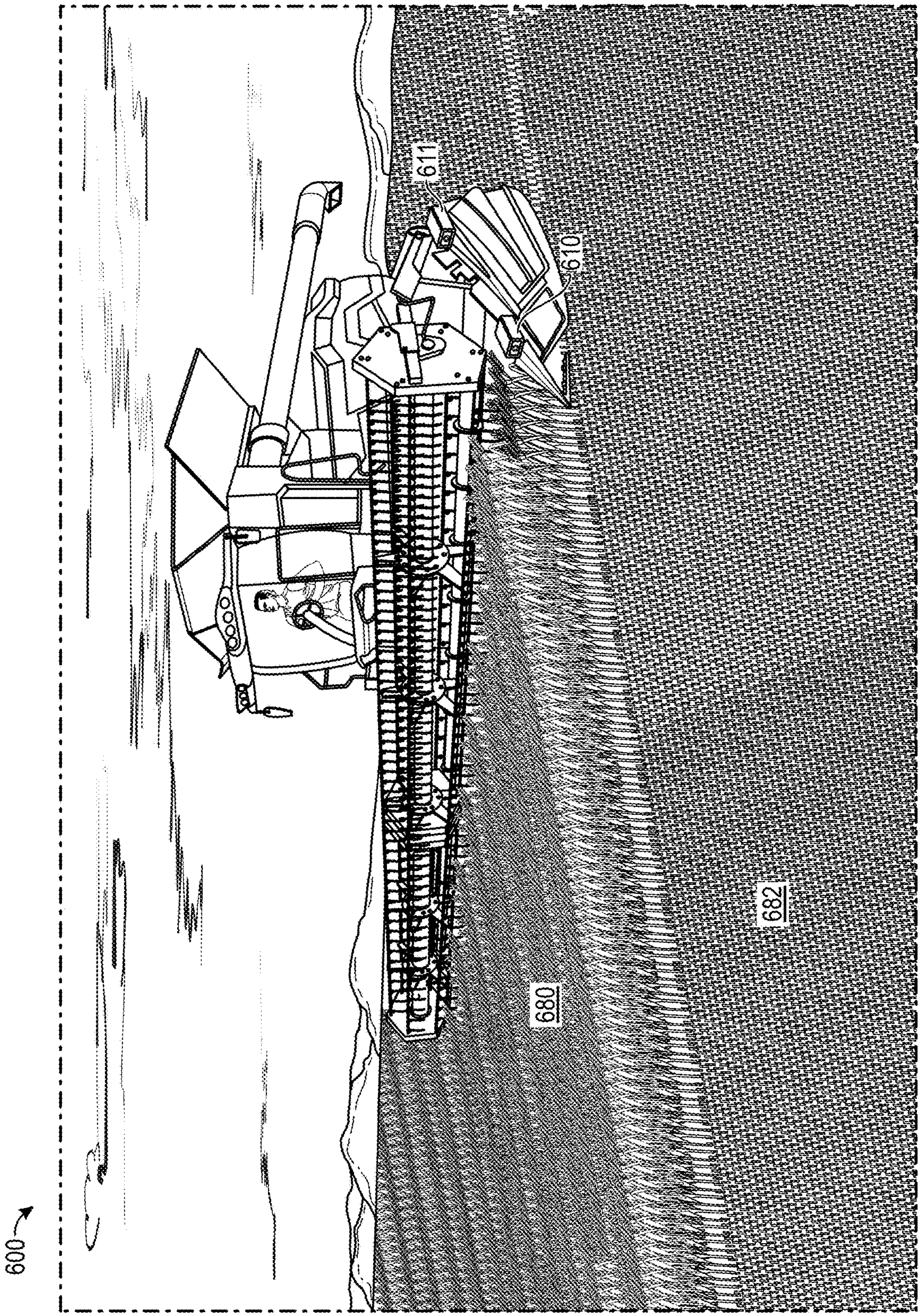

Referring to FIG. 6, the harvester 600 (e.g., bean harvester) includes looking forward sensors 610-611 having a field of view that is forward in a direction of travel of the harvester.

As the operator drives the harvester (e.g., 400, 500, 600) through the field, the imaging system captures images of unharvesting crop in a first region (e.g., 420, 580, 680) to be harvested that is adjacent to a second region (e.g., 482, 582, 682) that has been harvested. The captured images are analyzed to determine crop information from the first region that was dispersed by the harvester while harvesting the second region. Settings of the harvester for the first region can be adjusted based on analyzing the captured images as discussed in the operations of method 200.

Figure 7:
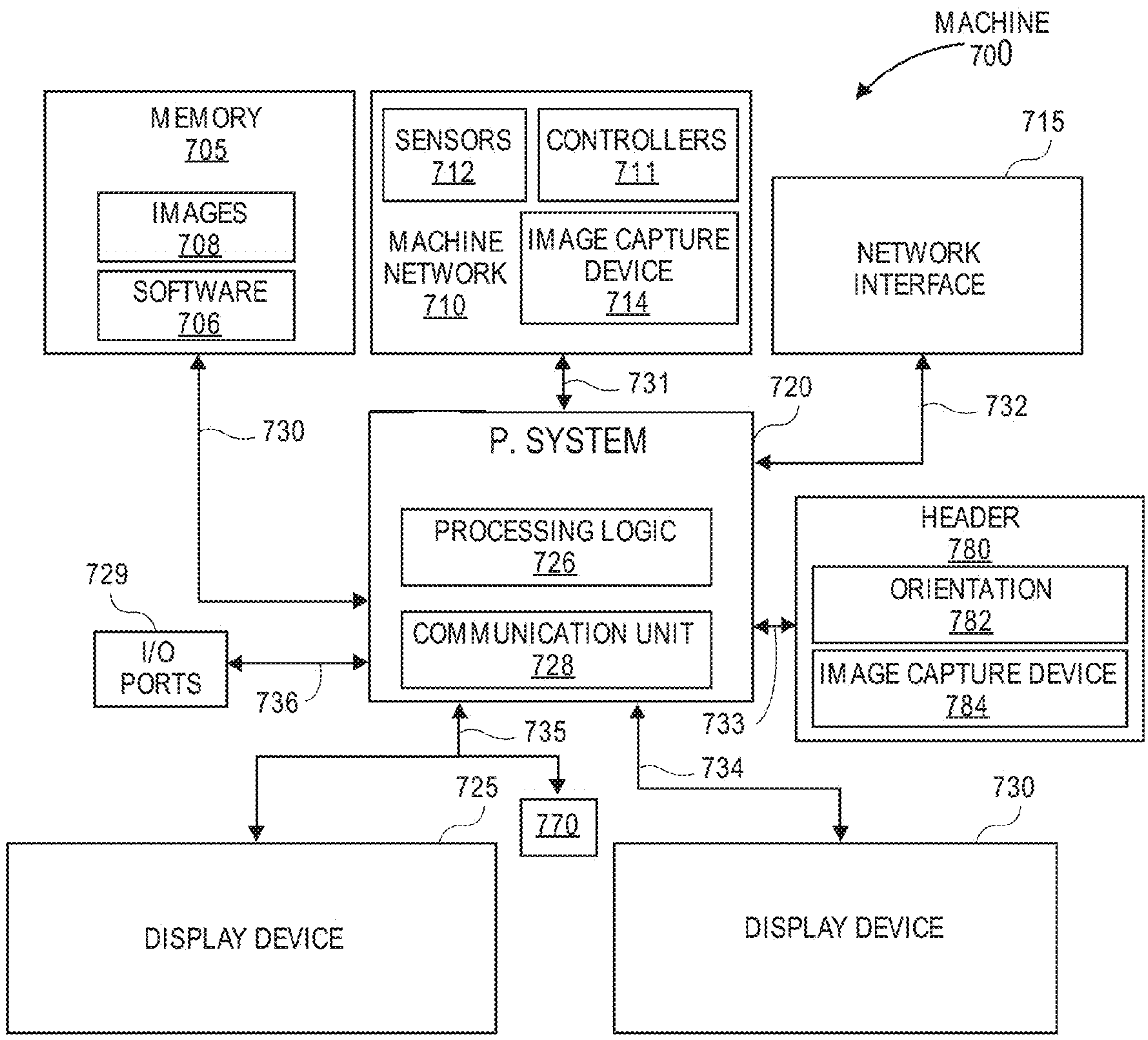
FIG. 7 shows an example of a system 700 that includes a machine 702 (e.g., tractor, combine harvester, etc.) in accordance with one embodiment.

FIG. 7 shows an example of a machine 700 (e.g., tractor, combine harvester, etc.) in accordance with one embodiment. The machine 700 includes a processing system 720, memory 705, machine network 710 (e.g., a controller area network (CAN) serial bus protocol network, an ISOBUS network, etc.), and a network interface 715 for communicating with other systems or devices. The machine network 710 includes sensors 712 (e.g., speed sensors, moisture sensor, auger sensor, mass flow sensor, head pressure sensor, etc.), controllers 711 (e.g., GPS receiver, radar unit) for controlling and monitoring operations of the machine, and image capture devices 714 (e.g., looking forward image capturing devices, rear looking image capturing devices, downward looking image capturing devices) for capturing images of crops and soil conditions of a field in accordance with embodiments of the present disclosure. The network interface 715 can include at least one of a GPS transceiver, a WLAN transceiver (e.g., WiFi), an infrared transceiver, a Bluetooth transceiver, Ethernet, cellular transceiver, or other interfaces from communications with other devices and systems including the implement 740. The network interface 715 may be integrated with the machine network 710 or separate from the machine network 710 as illustrated in FIG. 7. The I/O ports 729 (e.g., diagnostic/on board diagnostic (OBD) port) enable communication with another data processing system or device (e.g., display devices, sensors, etc.).

In one example, the machine performs operations of a combine (combine harvester) for harvesting grain crops. The machine combines reaping, threshing, and winnowing operations in a single harvesting operation. A header 780 (e.g., grain platform, flex platform) includes a cutting mechanism to cause cutting of crops to be positioned into an auger or draper (belt feed). The header 780 includes an orientation device 782 or mechanism for orienting a crop (e.g., corn, soybeans) for improving image capture with at least one image capture device 784.

The processing system 720 may include one or more microprocessors, processors, a system on a chip (integrated circuit), or one or more microcontrollers. The processing system includes processing logic 726 for executing software instructions of one or more programs and a communication unit 728 (e.g., transmitter, transceiver) for transmitting and receiving communications from the machine via machine network 710 or network interface 715 or implement via implement network 750 or network interface 760. The communication unit 728 may be integrated with the processing system or separate from the processing system. In one embodiment, the communication unit 728 is in data communication with the machine network 710 and implement network 750 via a diagnostic/OBD port of the I/O ports 729.

Processing logic 726 including one or more processors may process the communications received from the communication unit 728 including agricultural data. The system 700 includes memory 705 for storing data and programs for execution (software 706) by the processing system. The memory 705 can store, for example, software components such as image capture software, field view software for performing operations or methods of the present disclosure, or any other software application or module, images (e.g., captured images of crops), alerts, maps, etc. The memory 705 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 720 communicates bi-directionally with memory 705, machine network 710, network interface 715, header 780, display device 730, display device 725, and I/O ports 729 via communication links 730-736, respectively.

Display devices 725 and 730 can provide visual user interfaces for a user or operator. The display devices may include display controllers. In one embodiment, the display device 725 is a portable tablet device or computing device with a touchscreen that displays images (e.g., captured images and data (localized view map layer, high definition field maps of as-planted or as-harvested data or other agricultural variables or parameters, yield maps, alerts, economic loss data, seeds per area, cobs and cob size to determine performance, percent of cracked kernels, stand count data (number of stalks) to determine number of plants that germinated and grew, stalk diameter data measured from images, etc.)) generated by an agricultural data analysis software application or field view software application and receives input from the user or operator for a customized scale region and corresponding view of a region of a field, monitoring and controlling field operations, or any operations or methods of the present disclosure. The operations may include configuration of the machine or implement, reporting of data, control of the machine or implement including sensors and controllers (e.g., adjust angle of header, header height, header speed, reel speed, reel tine angle, deck plate spacing, adjusting fan speed, cylinder speed, concave clearance, vehicle speed, precleaner, chaffer, extension, sieve, draper belt speed) based on captured images from image capturing devices, and storage of the data generated. The display device 730 may be a display (e.g., display provided by an original equipment manufacturer (OEM)) that displays images and data for a localized view map layer, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 770 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

In one embodiment, a machine-accessible non-transitory medium (e.g., memory 705) contains executable computer program instructions which when executed by a data processing system cause the system to perform operations or methods of the present disclosure including customizing scale and corresponding field views of agricultural fields with expand and panning operations. While the machine-accessible non-transitory medium (e.g., memory 705) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

Figure 8A:
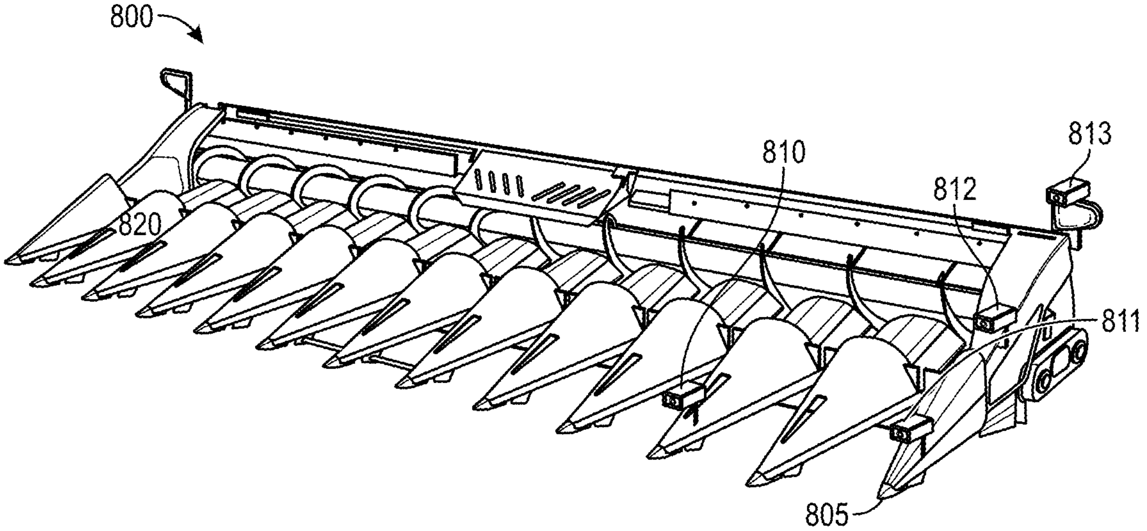
FIG. 8A illustrates an example of a header having an image capturing system in accordance with certain embodiments.

FIG. 8A illustrates an example of a header having an image capturing system in accordance with certain embodiments. The header 800 includes a plurality of snouts 820 and image capturing devices 810-813 that can be mounted in various locations (e.g., on snout, within snout, integrated with a reflector).

In one example, the image capturing devices can only be located so far in (usually no more than 3 snouts) so that the devices can see seeds dispersed onto the ground from the prior row. The tip of the snout 805 could be replaced with a camera (e.g., image capturing device 810, 811) in a protective cover that matches the contour of the snout. An example is a camera in a dome.

Figure 8B:
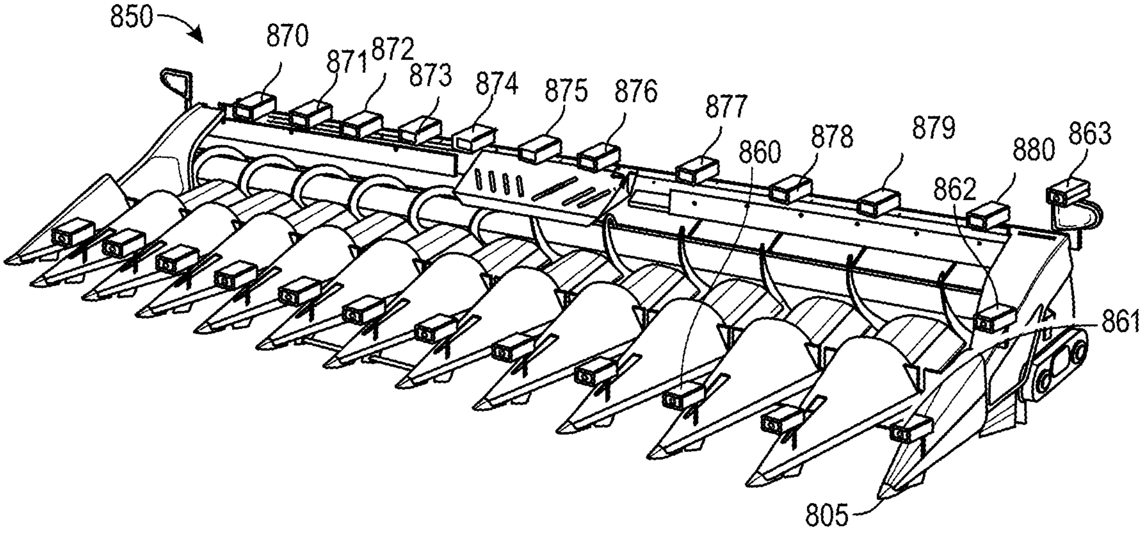
FIG. 8B illustrates an example of a header having an image capturing system in accordance with other embodiments.

FIG. 8B illustrates an example of a header having an image capturing system in accordance with other embodiments. The header 850 includes a plurality of snouts and image capturing devices that can be mounted in various locations (e.g., on snout, within snout, integrated with a reflector). The image capturing devices 805, 860-863 face forward to capture the number of seeds that were thrown from the prior pass of an adjacent region of the field. This header 850 may be a corn header to capture header loss at each row.

In this example, a plurality of image capturing devices 870-880 are positioned at each row after the header to capture the amount of seeds, which includes the number of seeds from the prior pass that were thrown. These devices 870-880 can be downward or rearward looking. By subtracting the prior seeds from images of devices 860-863 from the row amount from images captured by devices 870-880, this gives header loss at each row.

Figure 9:
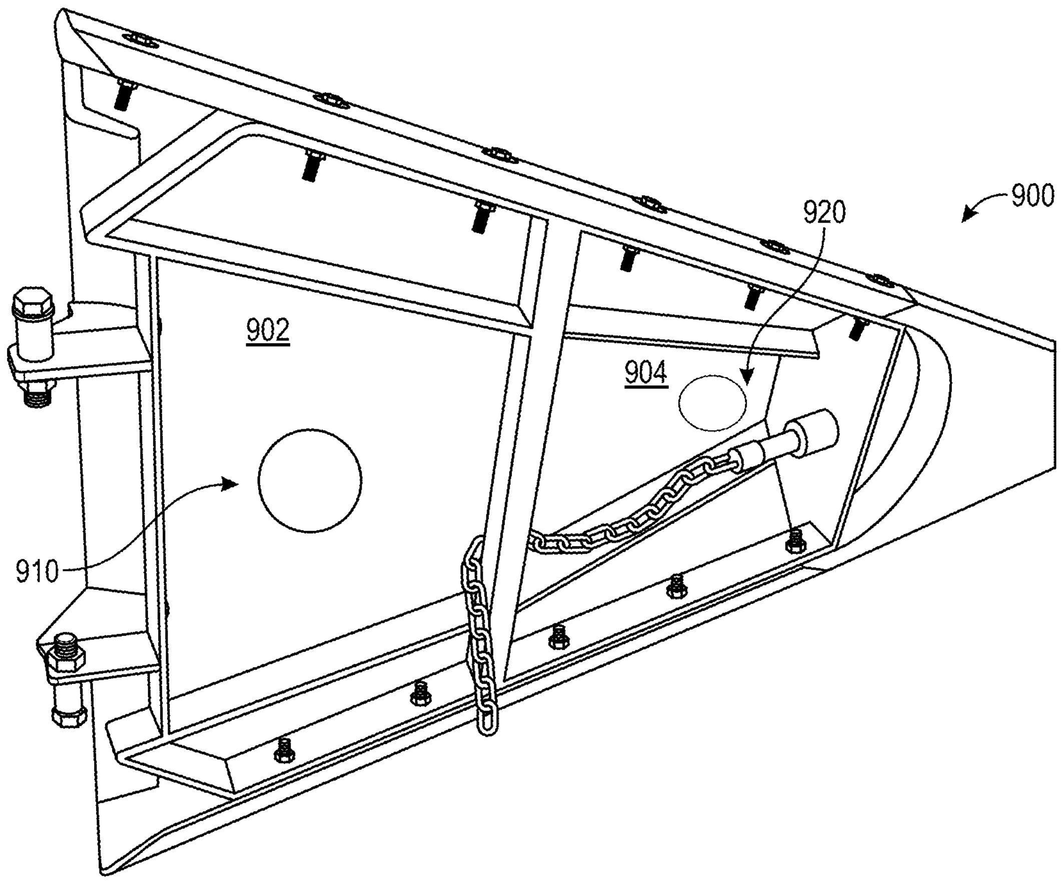
FIG. 9 illustrates mounting an image capturing device under a snout 900 in accordance with one embodiment.

Also, there are places to mount an image capturing device under a snout 900 as illustrated in FIG. 9. The image capturing devices 910 and 920 can be mounted on any surface (e.g., 902, 904) under a snout. Preferably, the image capturing devices would also need a light source.

Figure 10:
FIG. 10 illustrates an image 1000 of unharvesting crop in a first region to be harvested that is adjacent to a second region that has been harvested.
Figure 11:
FIG. 11 illustrates an image that has been captured by the imaging system of the harvester after settings of the harvester are adjusted based on analyzing the captured image 1000.

As the operator drives the harvester through the field, the imaging system captures images (e.g., an image 1000) as illustrated in FIG. 10 of unharvesting crop in a first region to be harvested that is adjacent to a second region that has been harvested. The captured images are analyzed to determine crop information (e.g., cob data 99, kernel data 98) from the first region that was dispersed by the harvester while harvesting the second region. FIG. 11 illustrates an image 1100 that has been captured by the imaging system of the harvester after settings of the harvester are adjusted based on analyzing the captured images as discussed in the operations of method 200. The image 1100 shows fewer cobs and kernels being dispersed from the second region, which reduces economic loss for the farmer.

Any of the following examples can be combined into a single embodiment or these examples can be separate embodiments. In one example of a first embodiment, a computer implemented method for adjusting settings of a harvester comprises capturing, with at least one image capture device that is located on the harvester, images of a field view of an unharvested region to be harvested, analyzing the captured images to determine crop information for a crop of a harvested region that is adjacent to the unharvested region, and adjusting settings or operating parameters of the harvester for the unharvested region based on the crop information for the crop of the harvested region.

In another example of the first embodiment, wherein adjusting settings or operating parameters comprises adjusting one or more of angle of header, header height, header speed, reel speed, reel tine angle, deck plate spacing, adjusting fan speed, cylinder speed, concave clearance, vehicle speed, precleaner, chaffer, extension, sieve, draper belt speed of the harvester for the unharvested region based on the crop information.

In another example of the first embodiment, wherein the at least one image capturing device comprises a looking forward device that looks forward of the harvester.

In another example of the first embodiment, wherein the at least one image capturing device comprises a downward viewing device to view crops and a ground surface of the unharvested region.

In another example of the first embodiment, the computer implemented method, further comprises displaying images or video captured by the at least one image capture device to a display device.

In another example of the first embodiment, the computer implemented method, further comprises displaying the crop information to a display device.

In another example of the first embodiment, wherein adjusting settings or operating parameters comprises automatically without user input adjusting settings or operating parameters of the harvester for the unharvested region based on the crop information.

In another example of the first embodiment, wherein the crop information comprises a level or amount of residue crop or a residue crop effectiveness.

In another example of the first embodiment, wherein the crop information comprises one or more of bent over crop that was not cut, soybean percentage of stalk uncut or length stalk uncut, percent area of bent stalks, a level or percentage of soybean cut quality, or percent area of intact pods.

In another example of the first embodiment, wherein the crop information comprises one or more of percentage of surface area viewed that has kernels, percentage of yield loss of crop based on bushel acre estimate or cost per acre estimate, bushels of crop lost per acre based on cost per acre estimate, or an economic loss window for crop from the harvested region that was dispersed or discarded by the harvester.

In one example of a second embodiment, a combine harvester comprises a header to engage a crop, at least one image capturing device to capture images of an unharvested region in front of the combine harvester, and at least one processor communicatively coupled to the at least one image capturing device. The at least one processor is configured to execution instructions to analyze the captured images to determine crop information for a crop of a harvested region that is adjacent to the unharvested region and to adjust settings or operating parameters of the combine harvester for the unharvested region based on the crop information for the crop of the harvested region.

In another example of the second embodiment, wherein the header includes a plurality of snouts and at least one snout includes the at least one image capturing device that is integrated with a tip of the snout.

In another example of the second embodiment, wherein at least one of three outer most snouts of the header includes a looking forward image capturing device.

In another example of the second embodiment, wherein at least one image capturing device is positioned underneath a header, e.g. underneath a snout, in a downward looking direction.

In another example of the second embodiment, wherein the at least one image capturing device is mounted on the header in a looking forward or downward direction.

In another example of the second embodiment, the combine harvester further comprises a chassis to support the harvester with at least image capturing device being mounted on the chassis.

In another example of the second embodiment, wherein to adjust settings or operating parameters comprises adjusting one or more of angle of header, header height, header speed, reel speed, reel tine angle, deck plate spacing, adjusting fan speed, cylinder speed, concave clearance, vehicle speed, precleaner, chaffer, extension, sieve, draper belt speed of the harvester for the unharvested region based on the crop information.

In another example of the second embodiment, the combine harvester further comprises a display device to display images or video captured by the at least one image capture device.

In another example of the second embodiment, wherein the display device to display the crop information.

In another example of the second embodiment, wherein the crop information comprises a level or amount of residue crop or a residue crop effectiveness.

In another example of the second embodiment, wherein the at least one image capturing device comprises a looking forward image capturing device positioned on a first outer edge of the header, an image capturing device positioned to view behind the header, a looking forward image capturing device positioned on a second outer edge of the header, and an image capturing device positioned on a frontal region of a frame of the harvester.

In another example of the second embodiment, wherein the looking forward image capturing devices face forward to capture a number of seeds that were thrown from a prior pass of an adjacent harvested region of the field.

In another example of the second embodiment, wherein the image capturing device is positioned to view behind the header to capture an amount of seeds after harvest for a current pass, which includes a number of seeds from the prior pass that were thrown.

In another example of the second embodiment, wherein the at least one processor is configured to execution instructions to determine a header loss at each row for a current pass based on the number of seeds from the prior pass and the amount of seeds for the current pass.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer implemented method for adjusting settings of a harvester comprising:

capturing, with at least one image capture device that is located on the harvester, images from an unharvested region;

analyzing the captured images to determine crop information including at least one economic crop loss value chosen from a level or amount of residue crop, residue crop effectiveness, crop header loss, soybean percentage of stalk uncut or length stalk uncut, a level or percentage of soybean cut quality, percentage of surface area viewed that has kernels, percentage of yield loss of crop based on bushel acre estimate or cost per acre estimate, and bushels of crop lost per acre based on cost per acre estimate; and adjusting settings or operating parameters of the harvester for the unharvested region based on the crop information for the crop of a harvested region.

2. The computer implemented method of claim 1, wherein adjusting settings or operating parameters comprises adjusting one or more of angle of header, header height, header speed, reel speed, reel tine angle, deck plate spacing, adjusting fan speed, cylinder speed, concave clearance, vehicle speed, precleaner, chaffer, extension, sieve, draper belt speed of the harvester for the unharvested region based on the crop information.

3. The computer implemented method of claim 1, wherein the at least one image capturing device comprises a downward viewing device to view crops and a ground surface of the region after the header.

4. The computer implemented method of claim 1, further comprising:

displaying images or video captured by the at least one image capture device to a display device.

5. The computer implemented method of claim 1, further comprising:

displaying the crop information to a display device.

6. The computer implemented method of claim 1, wherein adjusting settings or operating parameters comprises automatically without user input adjusting settings or operating parameters of the harvester for the unharvested region based on the crop information.

7. The computer implemented method of claim 1, wherein the crop information includes at least two of the values.

8. The computer implemented method of claim 1, wherein the header includes a plurality of snouts and at least one snout includes the at least one image capturing device that is integrated with a tip of the snout.

9. The computer implemented method of claim 8, wherein at least one of three outer most snouts of the header includes a looking forward image capturing device.

10. The computer implemented method of claim 8, wherein at least one image capturing device is positioned underneath a snout in a downward looking direction.

11. The computer implemented method of claim 1, wherein the at least one image capturing device is mounted on the header in a looking forward or downward direction.

12. The computer implemented method of claim 1, further comprising:

a chassis to support the harvester with at least image capturing device being mounted on the chassis.

13. The computer implemented method of claim 1, wherein the at least one image capturing device comprises a looking forward image capturing device positioned on a first outer edge of the header, an image capturing device positioned to view behind the header, a looking forward image capturing device positioned on a second outer edge of the header, and an image capturing device positioned on a frontal region of a frame of the harvester.

14. The computer implemented method of claim 1, further comprising: displaying an Economic Loss Window including the economic crop loss value in dollars lost per acre.

* * * * *